United States Patent
Jahn

[11] 3,724,505
[45] Apr. 3, 1973

[54] PIPE OR CONDUIT CLEAN OUT TRAP ASSEMBLY

[76] Inventor: Gunenter Jahn, 455 Provencher Boulevard, Winnipeg, Manitoba, Canada

[22] Filed: May 11, 1971

[21] Appl. No.: 142,254

Related U.S. Application Data

[63] Continuation-in-part of Ser. No. 829,556, June 2, 1969, abandoned.

[52] U.S. Cl. .................................. 138/92, 220/25
[51] Int. Cl. ......................... F16l 55/10, F16l 55/16
[58] Field of Search ........ 138/89, 92, 94, 95; 220/24, 220/24.2, 24.3, 25; 122/360, 363, 364

[56] References Cited

UNITED STATES PATENTS

| | | | |
|---|---|---|---|
| 1,317,565 | 9/1919 | Famoso et al. | 138/92 |
| 2,167,597 | 7/1939 | Weble | 132/92 X |
| 2,688,315 | 9/1954 | Davy | 122/360 |
| 2,528,040 | 10/1950 | Crauch | 285/286 X |
| 2,954,894 | 10/1960 | Feagan et al. | 220/25 |
| 3,094,238 | 6/1963 | Davidson | 220/25 |
| 3,416,571 | 12/1968 | Sivyer | 220/25 X |

Primary Examiner—Herbert F. Ross
Attorney—Kent & Ade

[57] ABSTRACT

A pipe elbow has an access opening provided with a marginal frame which is undercut to seat the elbow wall and is recessed to receive a closure plate so that the bottom surface of the closure plate and the frame are flush with the inner surface of the elbow wall in a smooth continuity. A flange on the upper surface of the closure plate inside the recess supportingly abuts a gasket which seals against the top wall of the recess when the closure plate is held in position by external clamping means. The supporting abutment of the flange with the gasket is directly opposite to the line of force of any fluid entering the recess from the interior of the elbow.

1 Claim, 3 Drawing Figures

PIPE OR CONDUIT CLEAN OUT TRAP ASSEMBLY

RELATED APPLICATION:

This application is a continuation-in-part of copending application Ser. No. 829,556, filed June 2, 1969 and now abandoned.

This invention relates to new and useful improvements in pipe elbows provided with an access opening so that the interior of the elbow and associated piping may be cleaned out to eliminate plugging by material passing therethrough, or for sanitary cleaning purposes. Particularly, the invention concerns itself with pipe elbows used in apparatus for paper manufacture, beer brewing and other such industrial processes, where the material flowing through the piping has a rather heavy consistency and is often under considerable pressure.

It is customary in the art to provide pipe elbows with access openings through which suitable cleaning implements may be inserted in both directions into associated pipes, and such access openings are usually provided with closures held in place by external clamping means. However, conventional arrangements of this type have a marked disadvantage in that the closure and its seat in the pipe elbow are not aligned smoothly with the interior surface of the elbow, but present cavities and other obstructions which the flowing material encounters, causing the material to build up rearwardly against its own flow until serious blockages occur and frequent cleaning is necessary.

The principal object of the invention is to eliminate this highly disadvantageous situation which is common in the prior art, this object being attained by the provision of a pipe elbow having an access opening with a marginal rim accommodating a closure plate in such manner that both the closure plate and the rim are flush with the inner surface of the elbow in a continuously smooth manner. Thus, any pockets and other obstructions inside the elbow are avoided and the material may flow through the elbow with the possibility of plugging and the necessity for cleaning greatly reduced.

Another disadvantage of prior art devices is that although the closure plate is usually provided with a gasket to seal against its rim or seat, the gasket is frequently arranged so that it is directly in the line of force of fluid which it is intended to seal, with the result that the gasket often becomes displaced by the fluid pressure and leakage occurs.

It is, therefore, another important object of the invention to eliminate this disadvantage by providing the closure plate with a flange which supportingly abuts the gasket in direct opposition to the fluid force, so that the gasket is firmly held in place and a highly effective sealing action is obtained.

With the foregoing more important objects and features in view and such other objects and features which may become apparent as this specification proceeds, the invention will be understood from the following description taken in conjunction with the accompanying drawings, wherein like characters of reference are used to designate like parts and wherein.

Figure 1:
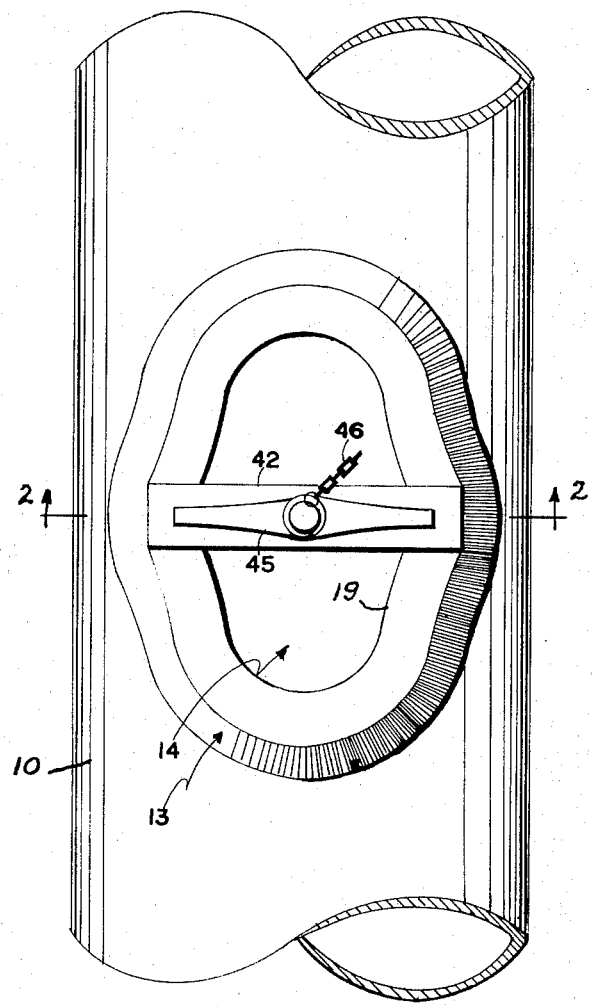
FIG. 1 is a fragmentary top plan view of a pipe elbow with the closure of the invention.

Referring now to the accompanying drawings in detail, the general reference numeral 10 designates a pipe elbow which is provided with an access opening 11 (see FIG. 2) surrounded by a marginal frame 13. The frame has upper and lower edges 16, 17 and outer and inner edges 18, 19, respectively, so that with the frame in position, the access opening is defined by the inner edge 19 of the frame.

Figure 2:
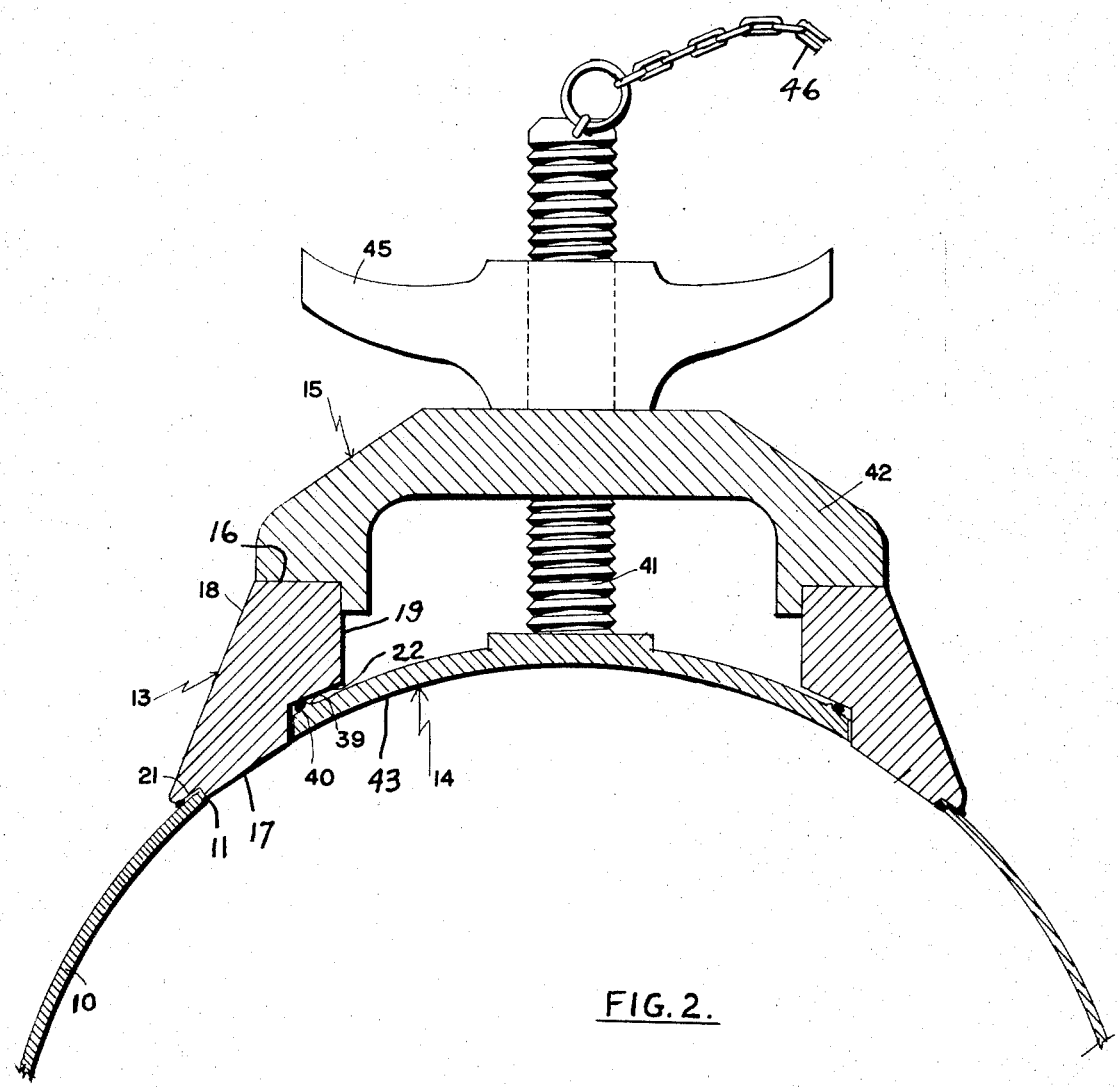
FIG. 2 is a fragmentary sectional view, taken substantially in the plane of the line 2—2 in FIG. 1.

The lower edge 16 of the frame 13 is formed with an undercut 21 which is open to the outer edge 18 of the frame and has seated therein the pipe elbow wall at the edge of the opening 11, as shown in FIG. 2. At this point the frame is secured to the elbow as by welding, or the like, and it is significant to note that the lower edge 16 of the frame 13 is smoothly flush with the inner surface of the elbow.

Figure 3:
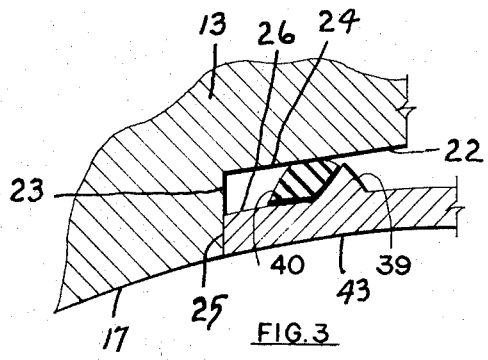
FIG. 3 is an enlarged sectional detail showing the gasket and flange on the closure plate in the recess of the frame.

The lower edge 16 of the frame 13 is also formed with a recess 22 which is open to the inner edge 19, the recess 22 having a side wall 23 and a top wall 24 which slants upwardly and inwardly from the side wall to the inner edge 19, as is best shown in FIG. 3. A closure plate 14 is removably positioned in the recess 22, the plate 14 having a marginal edge 25 disposed closely adjacent to the recess side wall 23 and also having an upper surface 26 spaced downwardly from the recess top wall 24.

An upwardly projecting flange 39 is formed integrally on the upper surface 26 of the closure plate 14 and an elastomeric gasket 40 is placed on the closure plate at the outside of but in supporting abutment with the flange 39, it being noted that both the flange and the gasket are located inside the recess 22 of the frame 13 so that the gasket may sealingly engage the top wall 24 of the recess when the closure plate is fastened in position by clamping means now to be described.

The clamping means comprise a screw-threaded stud or screw 41 which is secured centrally to the closure plate 14 and projects upwardly therefrom to carry a yoke 42 and a clamping nut 45 so that when the nut 45 is tightened while the yoke 42 engages the upper edge 16 of the frame 13, the closure plate 14 is drawn upwardly in the recess 22 and the gasket 40 sealingly engages the top wall 24 of the recess. A suitable anchoring element 46 may be secured to the stud 41 at one end thereof and at its other end to some convenient point on the frame 13, thus holding the parts 14, 41 and 45 together when the closure is open.

It is to be particularly noted that when the closure plate 14 is tightly held in position by the clamping means, the bottom surface 43 of the plate is smoothly aligned with the lower edge 17 of the frame 13 and also with the inner surface of the elbow 10, so that the inside of the elbow is continuously smooth across the closure area. This smoothness eliminates pockets and other obstructions such as commonly exist in prior art devices and cause the material flowing through the elbow to gather and build up rearwardly against its own flow until serious blockages occur and frequent cleaning is necessary. With the smooth interior contour across the closure of the invention, the material flows smoothly through the elbow so that occurrence of blockages and necessity for cleaning are greatly minimized.

Attention is also particularly directed to the arrangement of the gasket 40 and flange 39 inside the recess 22 of the frame 13. The flange supportingly abuts the gasket in direct opposition to the line of force of any fluid which may enter the recess from the interior of the elbow through whatever slight clearance may exist between the wall 23 and edge 25. Thus, the gasket is properly held in position against possible displacement by fluid pressure and a highly efficient sealing action is obtained. By contrast, in many prior art devices the sealing gasket is subjected directly to the fluid pressure without being backed by means such as the flange 39 herein, and the gasket frequently becomes displaced so that leakage inevitably results.

While in the foregoing there has been described and shown the preferred embodiment of the invention, various modifications and equivalents may be resorted to within the spirit and scope of the invention as claimed.

What is claimed as new is:

1. A pipe elbow having an outside wall portion provided with an access opening, a marginal frame for said opening secured to said wall portion, said frame having upper and lower edges and inner and outer edges, the lower edge of the frame having an undercut open to the outer edge and the outside wall portion of the elbow being seated in said undercut so that the lower edge of the frame is flush with the inner surface of the outside wall portion, the lower edge of the frame also having a recess open to said inner edge, said recess having a side wall and a top wall slanting upwardly and inwardly from said side wall to the inner edge of the frame, said top wall of the recess constituting a closure seat, a closure plate removably positioned in said recess and having a bottom surface flush with the lower edge of the frame and also with the inner surface of said wall portion so that the inside of the elbow is continuously smooth across the frame and the closure plate, said closure plate also having a marginal edge at the side wall of said recess and an upper surface spaced downwardly from the top wall of the recess, an upwardly projecting flange provided on the upper surface of the closure plate within the recess and in inwardly spaced relation from the marginal edge of the closure plate, a sealing gasket positioned on the upper surface of the closure plate outwardly of and in supporting abutment with said flange, a clamping screw extending upwardly from said closure plate through said frame, and clamping means coacting with said screw and with the upper edge of said frame for drawing the closure plate upwardly and bringing said gasket into sealing engagement with the top wall of said recess, the device being further characterized in that the supporting abutment of said flange with said gasket is directly opposite to the line of force of any fluid entering said recess from the interior of said elbow.

* * * * *